United States Patent [19]
Kayser

[11] Patent Number: 6,138,770
[45] Date of Patent: Oct. 31, 2000

[54] LAWN TRACTOR LOAD-CARRYING HITCH/FRAME AND SPRAYING APPARATUS

[76] Inventor: Howard H. Kayser, 220 W. 8th St., Garner, Iowa 50438

[21] Appl. No.: 09/013,792

[22] Filed: Jan. 26, 1998

[51] Int. Cl.[7] .................................................. A01B 59/00
[52] U.S. Cl. ......................... 172/677; 172/272; 239/172; 280/460.1
[58] Field of Search ..................... 172/677, 678, 172/679, 680, 684.5, 439, 445, 353, 272; 403/49, 230, 353; 211/182; 280/460.1, 461.1, 830; 239/172, 146, 147, 166

[56] References Cited

U.S. PATENT DOCUMENTS

| | | | |
|---|---|---|---|
| 539,796 | 5/1895 | Close | 403/353 |
| 2,044,884 | 6/1936 | Keller . | |
| 2,111,030 | 3/1938 | Mote . | |
| 2,495,928 | 1/1950 | Geraldson | 172/677 |
| 2,556,839 | 6/1951 | Cretella | 403/353 X |
| 2,573,784 | 11/1951 | Asbury . | |
| 2,584,484 | 2/1952 | McIntosh . | |
| 2,599,448 | 6/1952 | Hamilton et al. . | |
| 2,618,509 | 11/1952 | Carlson . | |
| 2,637,594 | 5/1953 | Spedding . | |
| 2,737,340 | 3/1956 | Bonini . | |
| 2,740,248 | 4/1956 | Pickens . | |
| 2,774,626 | 12/1956 | Gerbracht . | |
| 3,047,061 | 7/1962 | Wilcox et al. | 403/353 X |
| 3,396,685 | 8/1968 | Meiners | 172/677 X |
| 3,534,533 | 10/1970 | Luoma . | |
| 3,752,092 | 8/1973 | Vinyard | 172/677 X |
| 3,857,515 | 12/1974 | Zennie . | |
| 4,128,354 | 12/1978 | Amrogowicz | 403/353 X |
| 4,225,265 | 9/1980 | Hooker et al. | 403/353 |
| 4,242,855 | 1/1981 | Beaver, Jr. . | |
| 4,427,154 | 1/1984 | Mercil . | |
| 4,643,358 | 2/1987 | Jackson . | |
| 4,725,004 | 2/1988 | Baran, Jr. . | |
| 4,821,959 | 4/1989 | Browning . | |
| 4,867,409 | 9/1989 | Fimeri . | |
| 4,913,345 | 4/1990 | Setter . | |
| 4,962,599 | 10/1990 | Harris | 37/266 |
| 5,050,684 | 9/1991 | Vollmer . | |
| 5,082,065 | 1/1992 | Fletcher | 172/273 |
| 5,082,389 | 1/1992 | Balemi . | |
| 5,111,603 | 5/1992 | Knowlton et al. | 37/231 |
| 5,141,385 | 8/1992 | Tibbatts et al. | 403/353 X |
| 5,190,218 | 3/1993 | Kayser et al. . | |
| 5,360,070 | 11/1994 | Milton | 172/677 X |
| 5,382,110 | 1/1995 | Perotto et al. . | |
| 5,423,625 | 6/1995 | Gebauer et al. . | |

*Primary Examiner*—Victor Batson
*Attorney, Agent, or Firm*—Zarley, McKee, Thomte, Voorhees & Sease

[57] ABSTRACT

A frame for supporting a load, the frame including a quick mount/dismount hitch for a medium sized lawn and garden tractor. The hitch includes mounting brackets on one end of the frame, the mounting brackets including spaced apart sets of engagement members that matingly engage complimentary engagement members that are fixed on the rear of the tractor. The mating of the engagement and complimentary engagement members utilize the force of the weight of the frame and any load to seat the frame to the tractor. A lock down mechanism can optionally be used to secure the frame in place. The frame can support, for example, a spraying system including spray tank, spray boom, controls, and fluid conduits. The boom can optionally have double break away arms. A pump to provide spraying pressure can be mounted under the tractor and use the power of the engine of the tractor.

4 Claims, 10 Drawing Sheets

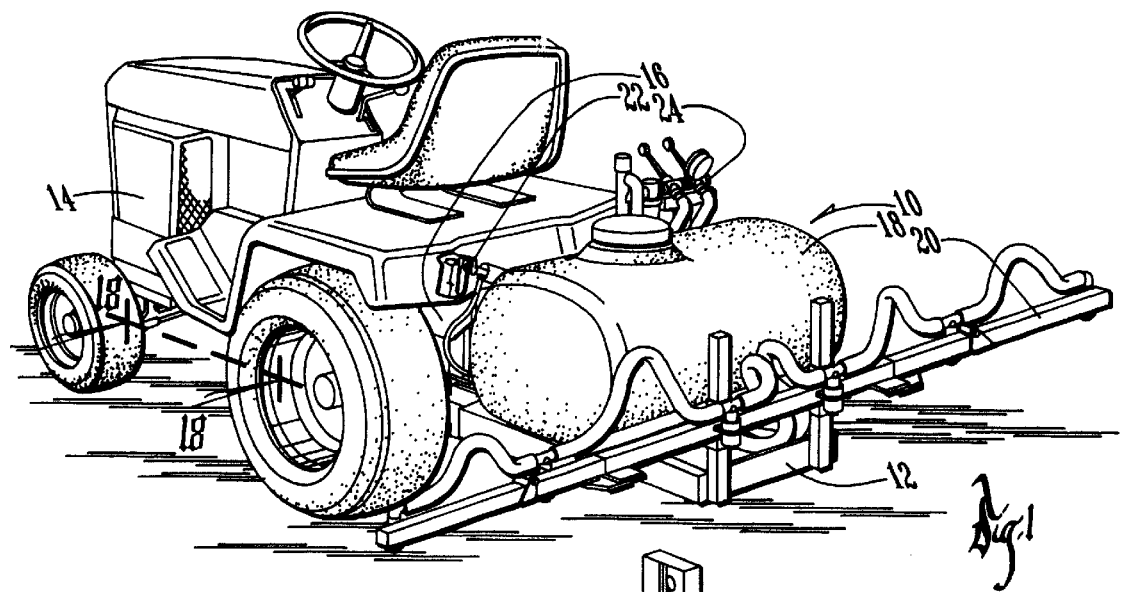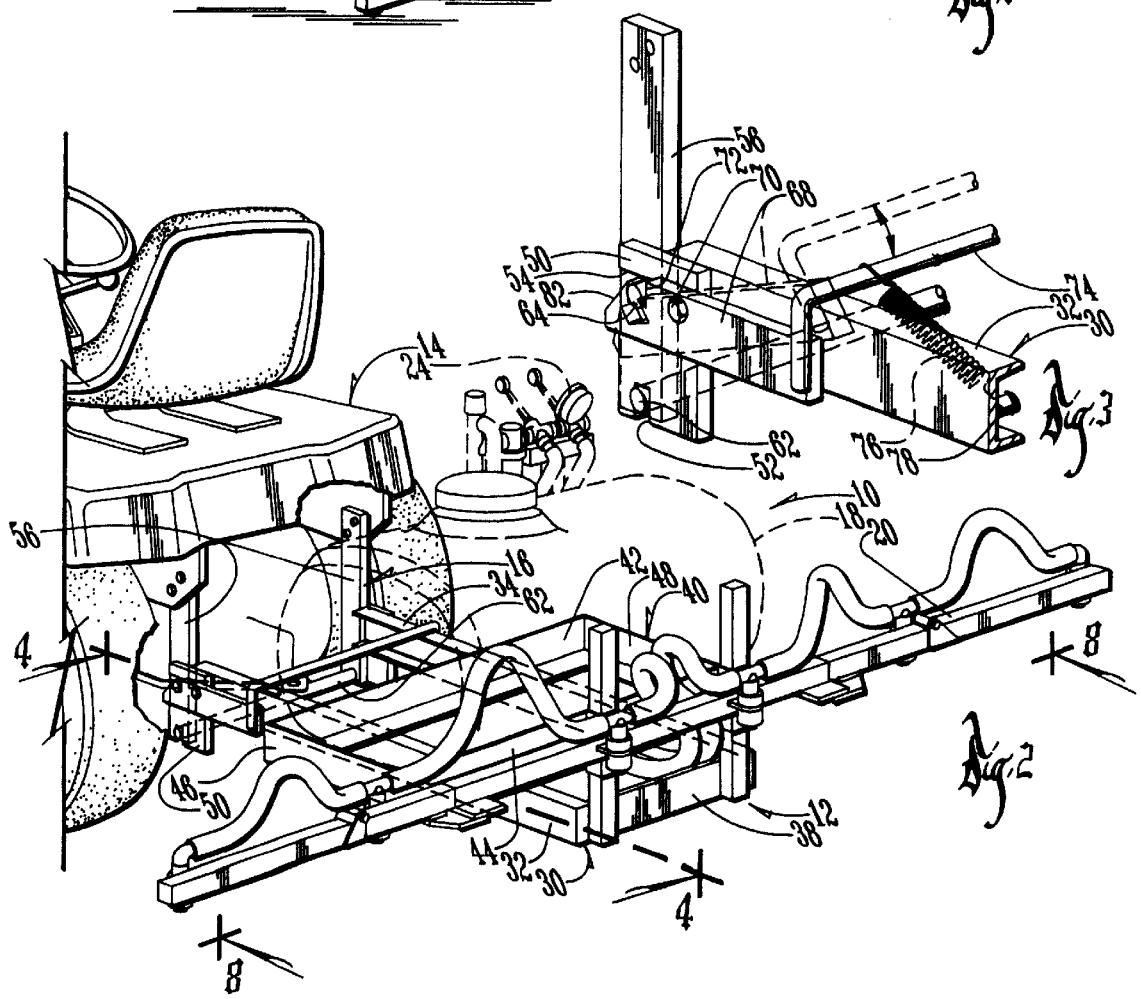

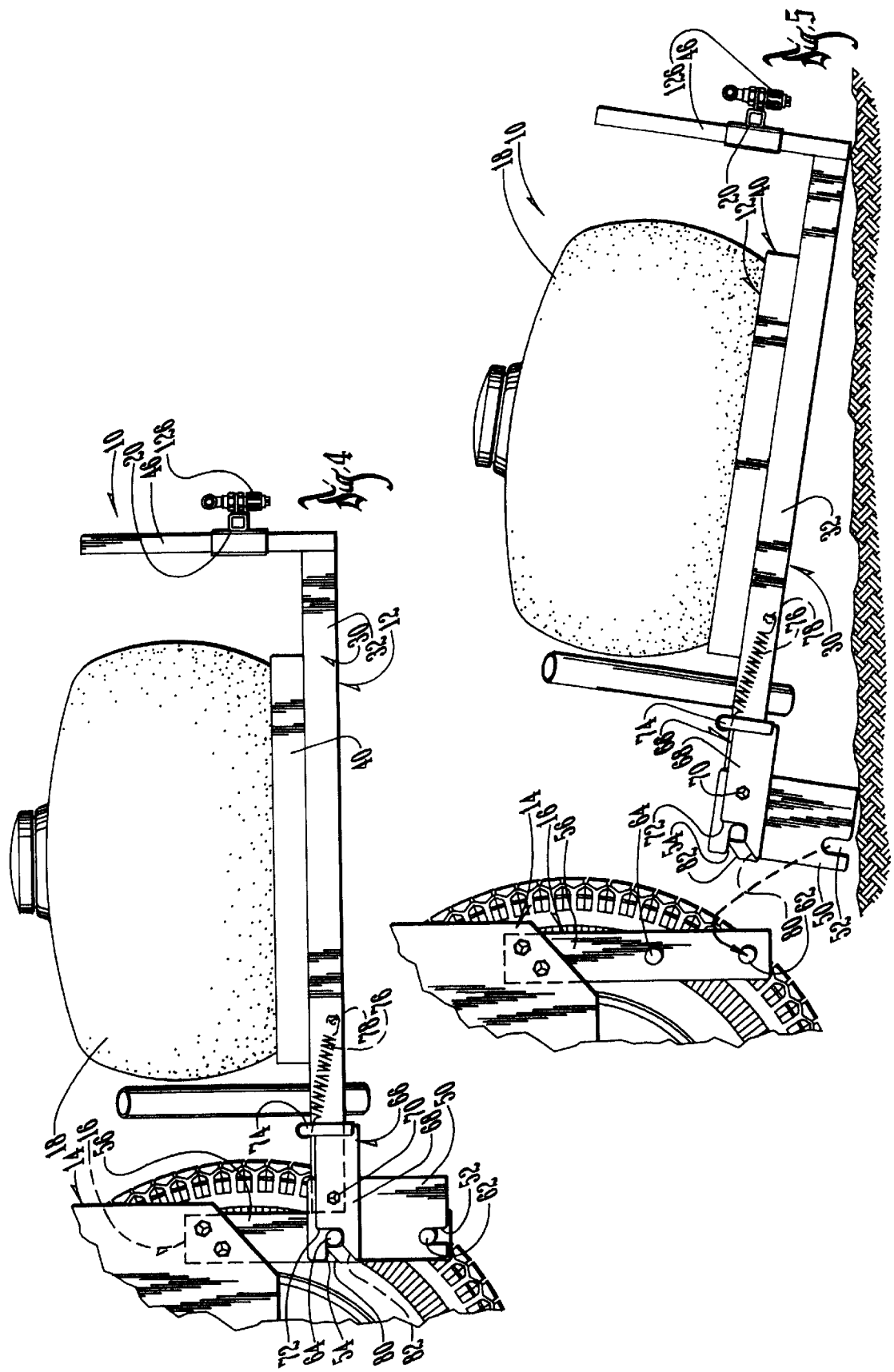

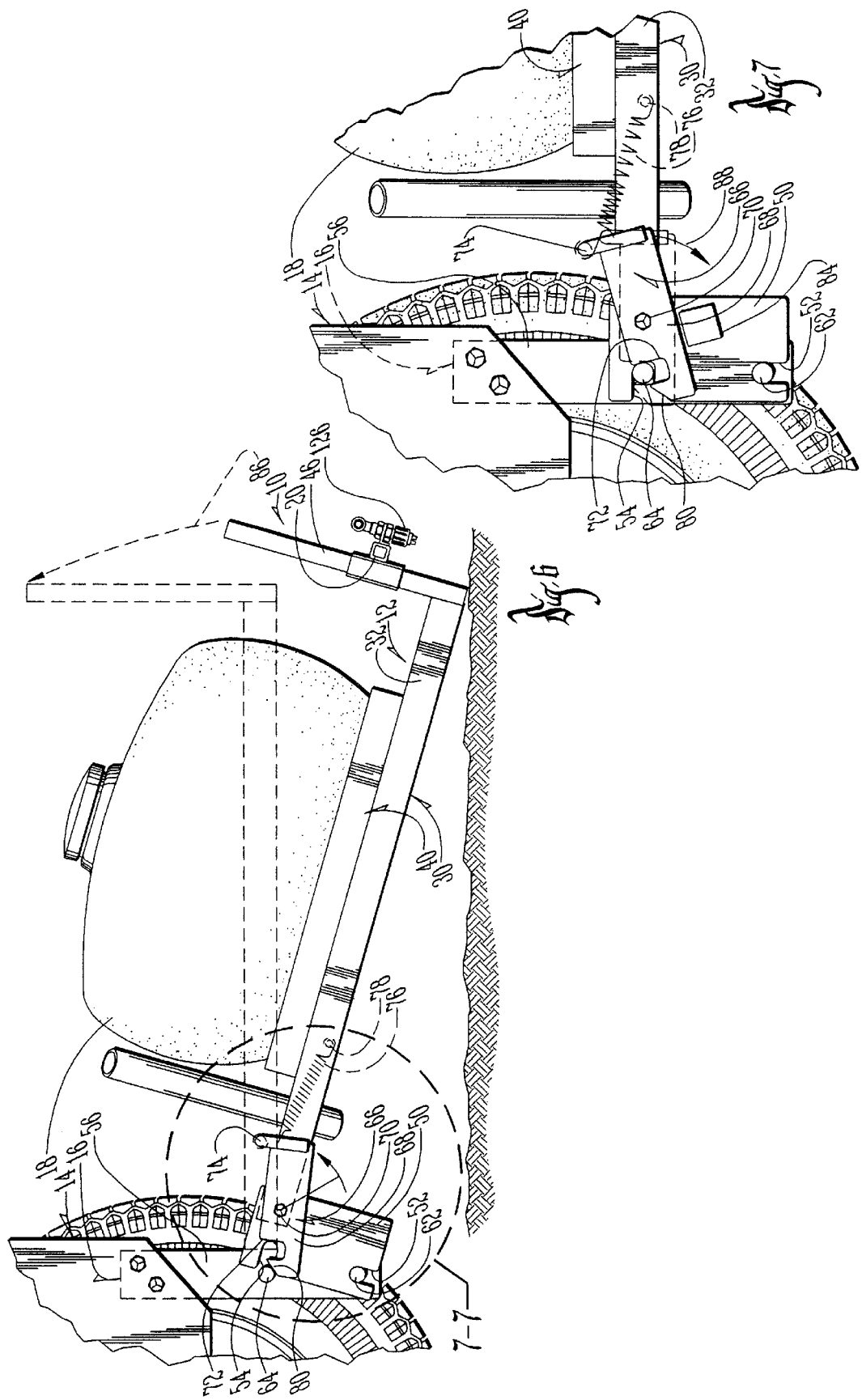

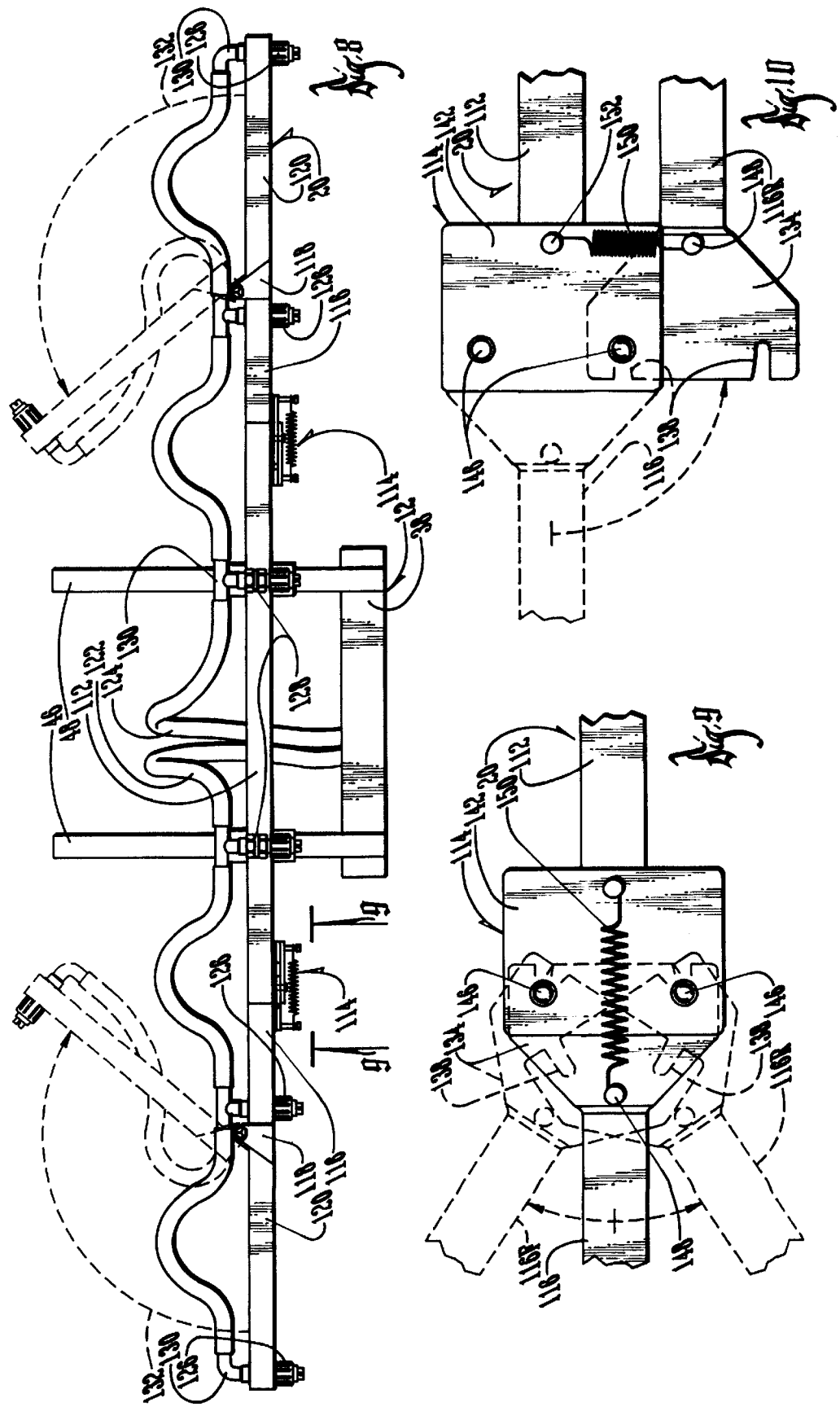

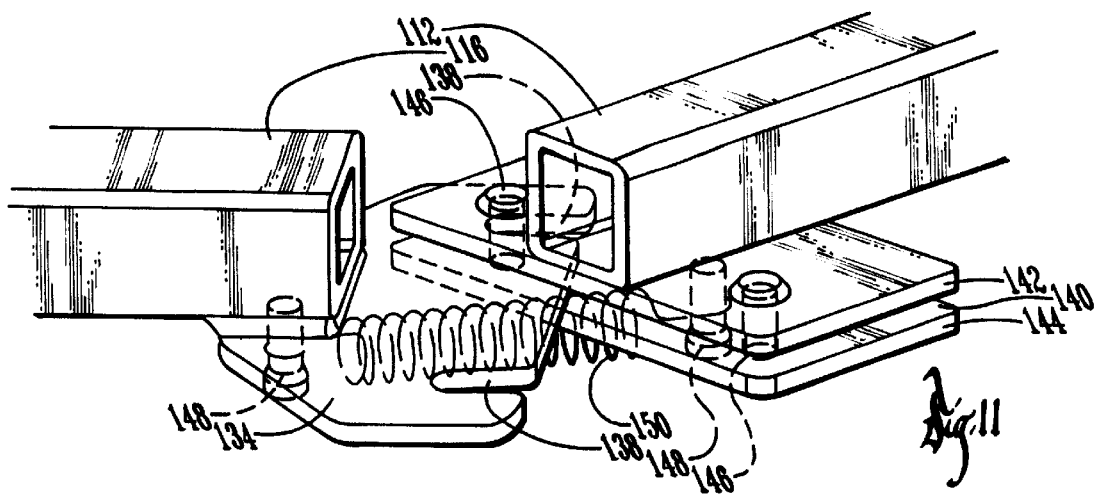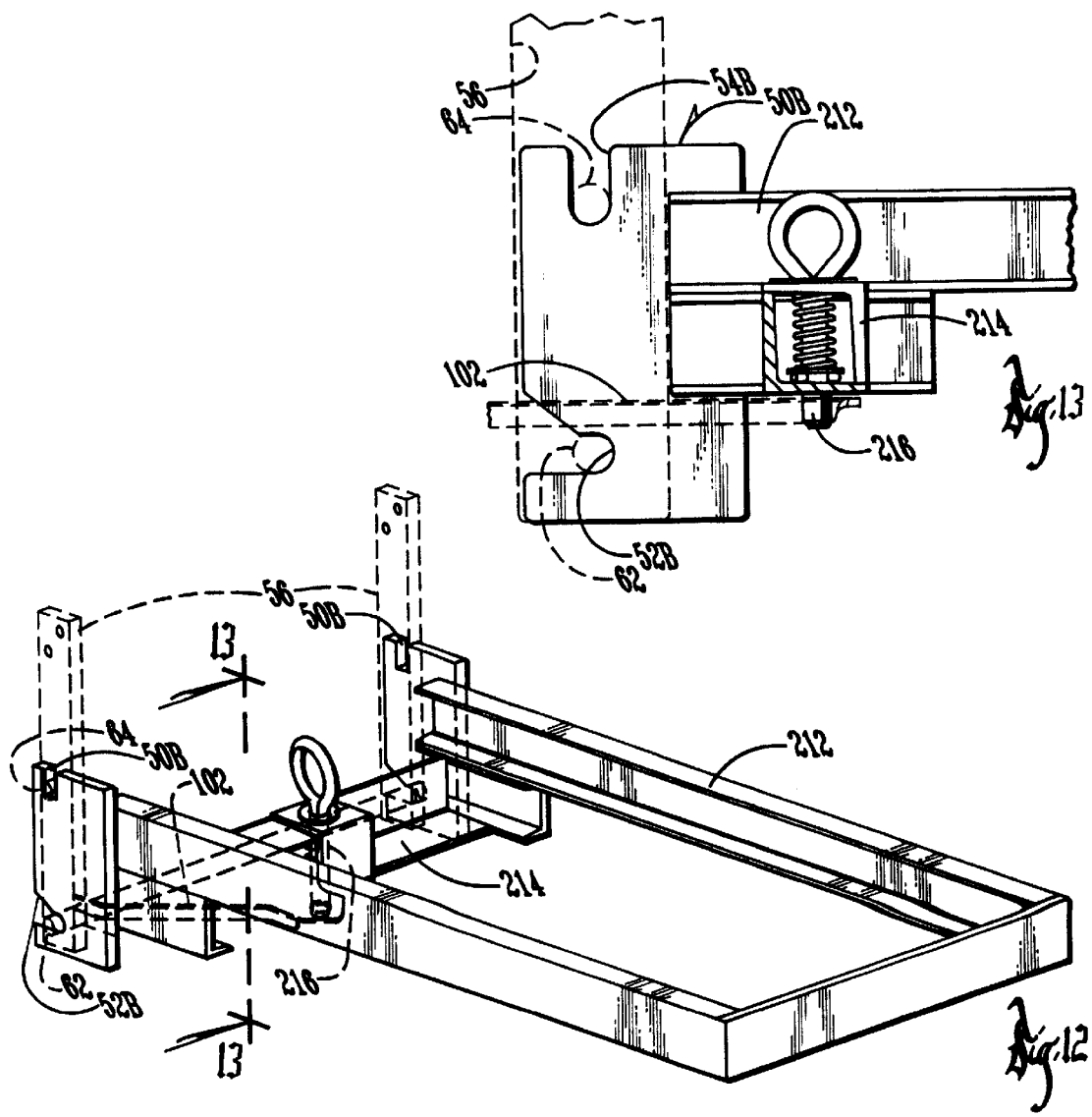

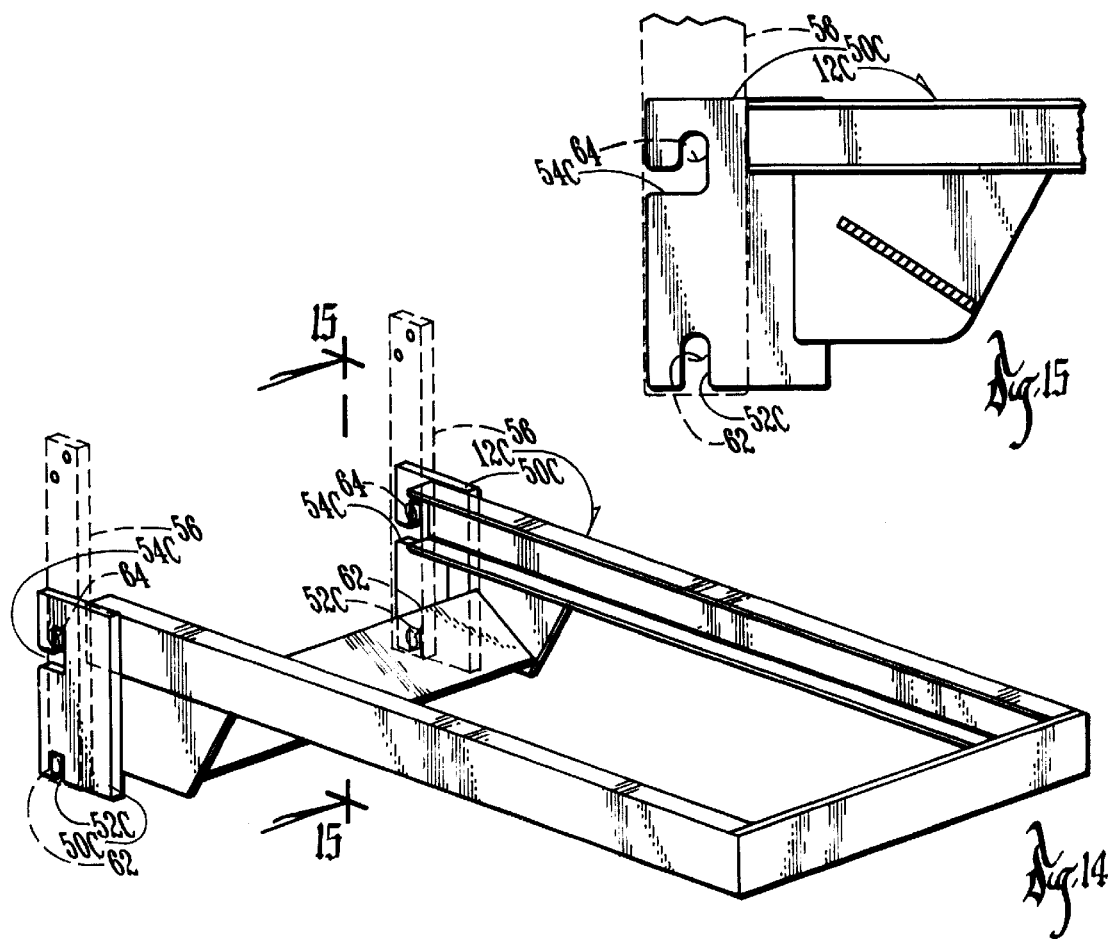
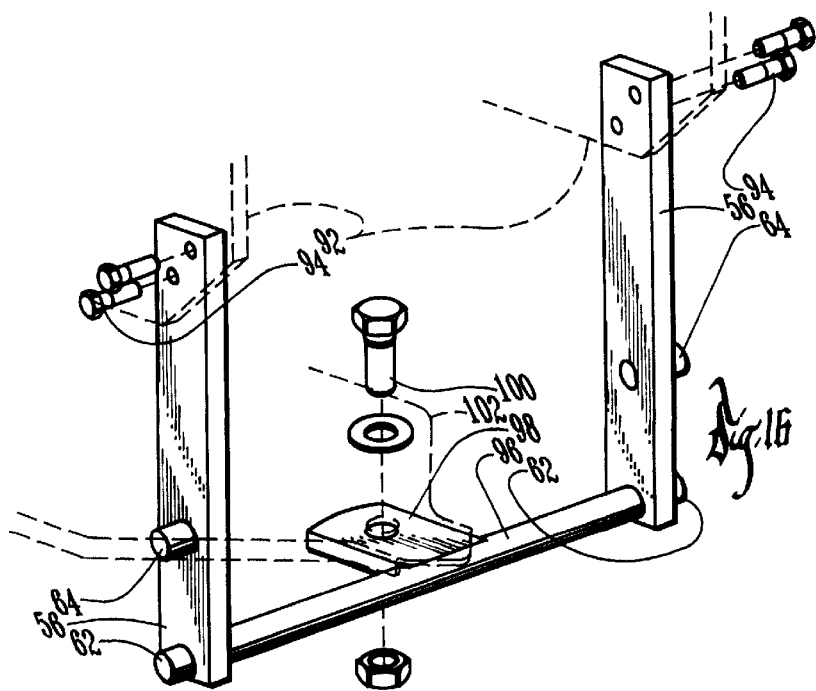

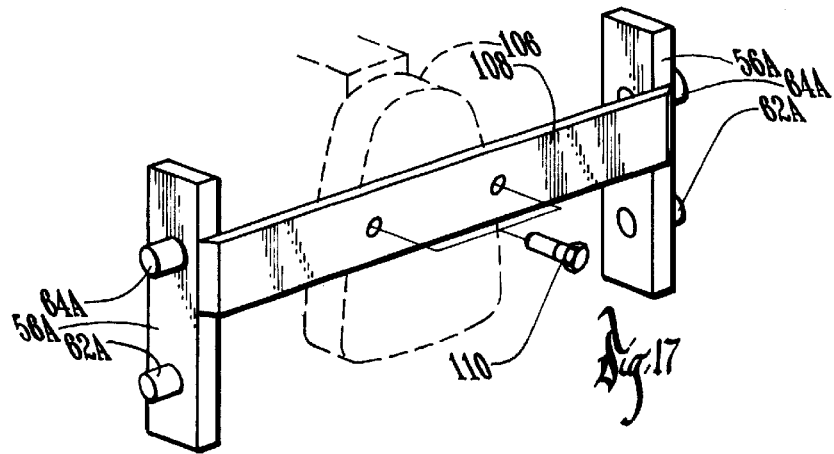
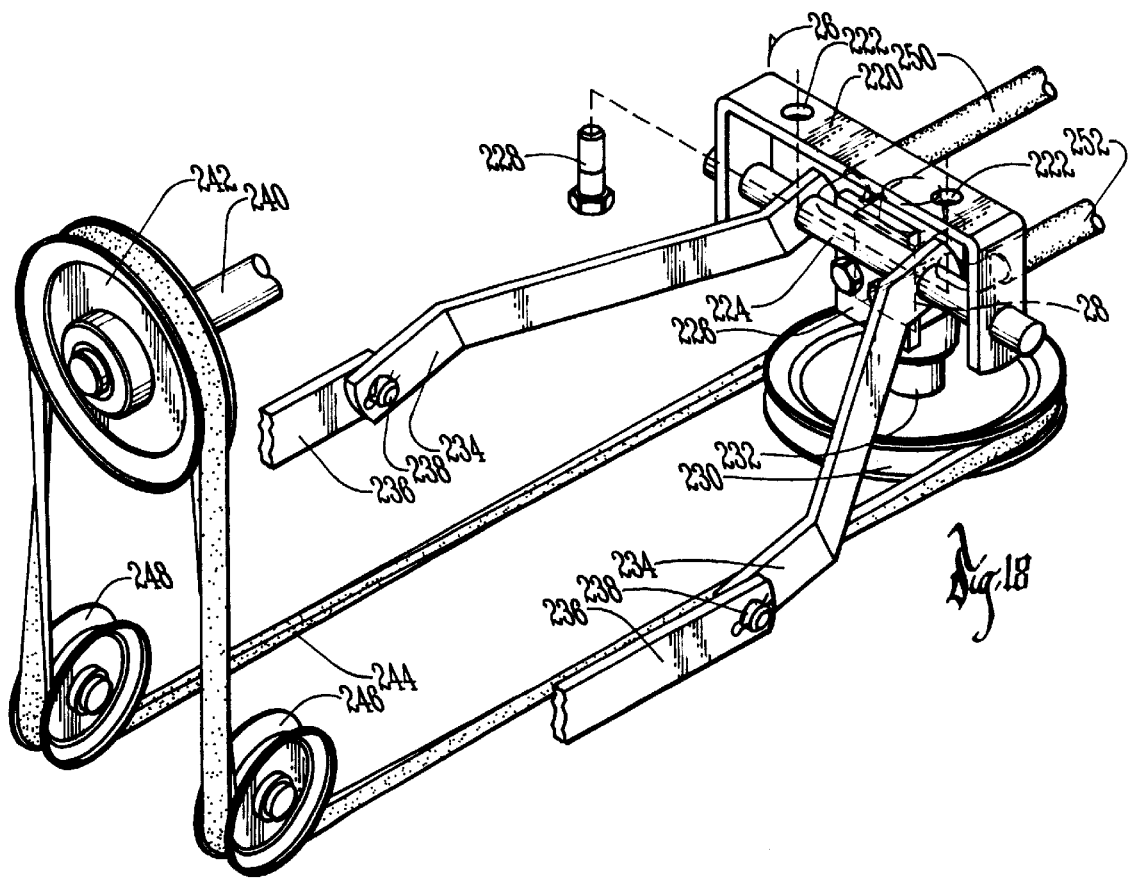

LAWN TRACTOR LOAD-CARRYING HITCH/FRAME AND SPRAYING APPARATUS

BACKGROUND OF THE INVENTION

1. Field of the Invention

The present invention relates to a quick mount connection for a load-bearing frame to a lawn garden-size tractor, which can, for example, be utilized with a spray system, including a substantial sized tank and spray boom, and an optional spray gun, which in turn could be powered by a hydraulic pump in turn powered by the output of the lawn tractor engine.

2. Problems in the Art

A need has been identified for a spraying system that could be advantageously, efficiently, and economically operated with respect to tractors which are between large agricultural field type tractors that have power take off (PTO) capabilities, and hand-held, portable spraying units that primarily are operated by manual pressurization. Larger tractors, even larger lawn and garden type tractors with power take off, are too heavy or lack maneuverability or ability to be transported, compared to certain smaller lawn and garden tractors. Portable hand sprayers cannot get the efficient coverage of relatively large areas of ground that is possible with sprayer systems carried on and moved by tractors.

Attempts to fill this need have been made but have certain deficiencies. Some systems place a self-contained spraying system on a trailer which is pulled behind the lawn and garden tractor. Such systems rely on power generated by the tractor itself to move the system over the ground and on an independent power source such as an electric motor or gasoline engine, to provide pressurization for spraying. U.S. Pat. No. 5,190,218, to Kayser et al., explains the deficiencies and problems in the art, and is incorporated by reference herein. Among the problems that existed in the art included the lack of a quick and easy mount to the tractor itself instead of having to pull and maneuver a trailer; lack of substantial tank capacity; and an inability to maintain high enough or even enough spraying pressure. Other problems or deficiencies are set forth in the U.S. Pat. No. 5,190,218.

The Kayser U.S. Pat. No. 5,190,218 sought to address the deficiencies in the art. It discloses a frame that is attached to the back of the medium size lawn and garden tractor and which supports a substantial sized spray tank and a boom containing multiple spray nozzles. The spray pressure is accomplished by a hydraulic pump mounted to the lawn and garden tractor and which utilizes power from the tractor engine to operate the pump. However, it has been found that room for improvement exists even with respect to the advances set forth in the U.S. Pat. No. 5,190,218.

For example, it was difficult for one person to mount or dismount the U.S. Pat. No. 5,190,218 spraying system from the tractor. Although the mount did allow one person to set one end of the frame on the back of the tractor, the remainder of the frame had to be picked up and tilted forward. Then, two spring loaded pins had to be individually operated to finally lock the frame in place. The spring loaded pins are on opposite sides of the frame and there is not very much room between the tractor tires and the mount to operate the same. It is therefore difficult or impossible for one person to operate and completely mount or dismount, and at least was cumbersome, even for two persons. Also, detachment of the spraying system generally required detachment of hydraulic hoses and other fittings or mounts with the attendant problems associated therewith. Moreover, the position of the pump was at a location and height relative to the spray tank that at times needed self priming capabilities, which either results in faulty or unsatisfactory operation of the spraying system or necessitates use of more expensive and complex self priming pumps. Moreover, it was found that substantial width spray boom arms (for example, over three feet or so wide), extending laterally from both sides of the device, are susceptible to unintentional and inadvertent interference with objects while the tractor is moving, which can result in damage to the spraying system. Inadvertent striking of buildings, fences, trees, or other obstacles could seriously damage the arms.

Therefore, a real need has been identified in the art. The present invention provides an apparatus and method for overcoming or improving over the problems and deficiencies in the art, including an apparatus or method which:

1. is easier to mount and dismount, including mount and dismount by one person in many instances;
2. is easier to handle;
3. is securely fixed to the tractor;
4. is safer to use;
5. is simple in structure, use, and operation;
6. reduces the cost of manufacture and assembly;
7. is flexible with respect to its adaptability to different sized tractors and operational systems;
8. provides better spraying systems and capabilities;
9. is more economical;
10. is more efficient;
11. is durable;
12. uses existing power from the lawn tractor;
13. is substantially self-contained in that the entire spraying system can be installed and removed without having to unhook hydraulic hoses.

These and other objects, features, and advantages of the invention will become more apparent with reference to the accompanying specification and claims.

SUMMARY OF THE INVENTION

The present invention is an apparatus and method for an easily attachable and detachable load-carrying frame for use with medium sized lawn tractors. The invention optionally can be advantageously used with a spraying system which includes the features of quick and easy connect and disconnect, no need for a self priming pump, power by the tractor engine, and adaptability, to a variety of medium sized lawn and garden tractors. A spray boom of a width wider than the tractor can be utilized. A feature of the boom can be double break away boom arms, which deter damage to the boom if the boom arms strike an object whether the tractor is going forward or backwards. A hand sprayer for hard to reach or special spraying jobs, can optionally be available.

The quick attach/detach of the load-bearing frame includes a hitch having a portion on the tractor and a portion on the frame. The two portions have cooperating and mating structure which allows one part of the portion on the frame to be placed on the portion on the tractor so that the frame is preliminary supported or connected to the tractor in a first position. By additional movement of the frame relative to the tractor to a second position, such as by tilting, the portion on the frame is then brought into a final position relative to the portion on the tractor. The weight of the frame and any load on the frame then cause the frame to be fully supported by the tractor, and no wheels, wagon or trailer are needed. Optionally, a lock-down mechanism can be manually engaged or automatically functions to lock the frame into final position.

Detachment requires the reverse procedure. When any lock-down mechanism is released, the frame is manually tilted or lifted away from the second position to the first position. The frame is then able to be moved apart from the tractor for complete detachment. It can then be stored until needed for a subsequent use.

The frame and any load are generally sized so that one adult person could manipulate the same to the first and second positions. If the load is a spraying system, a pump assembly comprising a mounting bracket and a hydraulic pump with a pulley attached to its drive shaft, is mountable beneath the tractor, essentially where a mower deck is usually mounted. Existing belts for driving the mower deck are used to transfer rotational power from the drive shaft of the engine to the pump pulley. Thus, the need for an independent power source for generating spraying pressure is eliminated.

The low position of the pump, under the tractor, also eliminates the need for the pump to be self-priming. The mounting bracket is completely detachable from the tractor. Therefore, the complete connection of the spraying system from the tractor can be accomplished without disconnecting hydraulic hoses, which takes time and care and includes the risk of spillage of potentially hazardous chemicals or loss of product.

A universal hitching portion for the frame can be made by utilizing a fixed construction on the frame portion of the hitch and creating different tractor-side adapter brackets which can be securely fixed to and used with a variety of different medium sized lawn and garden tractors that present the same mating structure to the frame portion of the hitch.

The double break-away boom arms according to the invention use joints along each side of the boom, which extends transversely wider than the width of the tractor. The joints hold the boom rigidly unless a certain level of force from either front or back of the boom is experienced. When that occurs, the joint releases the affected side of the boom to pivot and effectively break-away from its rigid form to avoid damage.

BRIEF DESCRIPTION OF THE DRAWINGS

FIG. 1 is a perspective view of a preferred embodiment of the invention, including a spraying system, attached to a medium sized lawn and garden tractor which does not have a power take off.

FIG. 2 is slightly enlarged partial view of FIG. 1, showing the spray tank in ghost lines to show attachment of the invention to the tractor in more detail.

FIG. 3 is an enlarged isolated perspective view of a portion of the hitch according to FIG. 2, showing operation of a lock-down mechanism.

FIG. 4 is a side elevational view taken along the lines 4—4 of FIG. 2, and shows the preferred embodiment in fully mounted position to a tractor.

FIG. 5 is similar to FIG. 4 but shows the preferred embodiment detached from the tractor.

FIG. 6 is similar to FIGS. 4 and 5 but shows the preferred embodiment partially mounted on the tractor.

FIG. 7 is an enlarged side elevational view taken along the lines 7—7 of FIG. 6, but showing the preferred embodiment in the fully attached position to the tractor.

FIG. 8 is a rear isolated elevational view of the spray boom of FIG. 1 taken along lines 8—8 of FIG. 2, showing the foldability of outer sections of the spray boom arms.

FIG. 9 is an enlarged top plan view of a double break away joint according to the preferred embodiment of the present invention taken along lines 9—9 of FIG. 8.

FIG. 10 is a top plan view of the double break away joint of FIG. 9, further showing its ability to fold upon itself to allow further foldability of the spray boom.

FIG. 11 is a still further enlarged isolated perspective view of the break away joint of FIGS. 9 and 10.

FIG. 12 is a perspective view of an alternative embodiment of a hitch and frame according to the invention.

FIG. 13 is a partial side elevational view taken along line 13—13 of FIG. 12.

FIG. 14 is a perspective view of another alternative embodiment of a hitch and frame according to the invention.

FIG. 15 is a partial side elevational view taken along line 15—15 of FIG. 14.

FIG. 16 is an isolated perspective view of an adapter member for one type of tractor to receive the hitch and frame of the invention.

FIG. 17 is an isolated perspective view of an alternative adapter member for a different tractor.

FIG. 18 is an isolated perspective depiction of a pump assembly according to a preferred embodiment of the invention and its operative connection to the rotational output of the tractor engine.

DETAILED DESCRIPTION OF PREFERRED EMBODIMENT

Overview

Figure 13A:
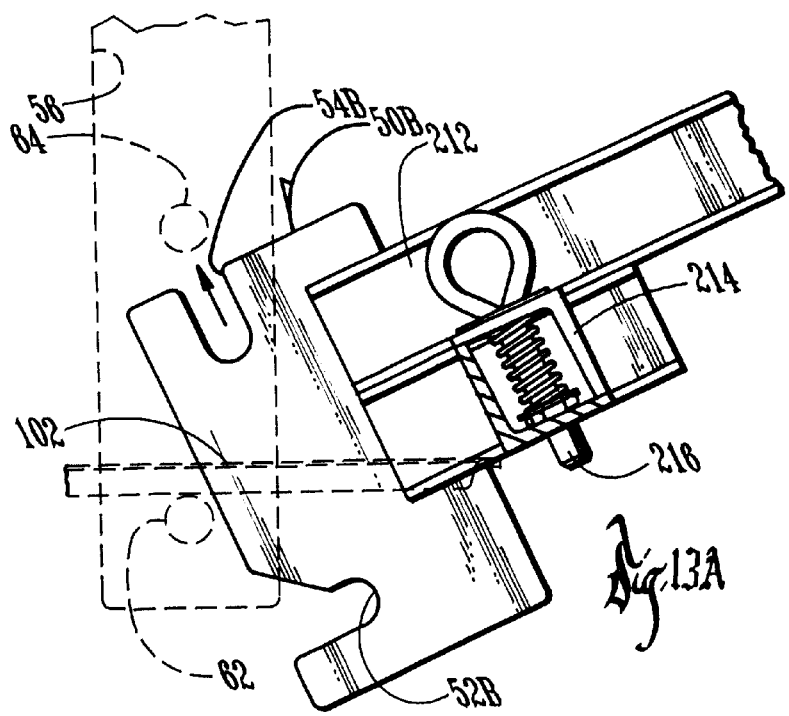
FIGS. 13A and 13B are similar to FIG. 13 but show steps of attachment and detachment of the frame of FIGS. 12 and 13 to a tractor.

For a better understanding of the invention, one preferred embodiment will now be described in detail. Frequent reference will be taken to the drawings. References numerals will be used throughout the drawings to indicate certain parts and locations in the drawings. The same reference numerals will refer to the same parts or locations in all of the drawings unless otherwise indicated.

The structure according to the preferred embodiment will first be generally described, followed by more specific structural descriptions. Thereafter operation of the preferred embodiment will be discussed followed by exemplary options, features and advantages of the invention.

General Environment

The preferred embodiment is shown and described as a quick attach/detach load bearing frame. The load is a spraying system. The spraying system includes a spray tank to hold substances such as fertilizers, insecticides, herbicides, or other substances that are sprayable through pressurization and nozzles. An example of such a use of such a spraying system would be with regard to lawn care service (residential and/or commercial) where it is advantageous to cover substantial areas in as short of time as possible. The spray tank therefore holds a substantial quantity of material, for example on the order of 25 gallons. A spray boom is used which can cover a wide swath (for example eight feet).

It is to be understood, however, that the invention is not limited to lawn care spraying. The quick attach/detach hitch and frame is not limited to supporting a spraying system.

Furthermore, as is previously discussed, the invention is primarily useful with medium size tractors that do not have PTO outputs. For the purposes of this description, the use of the term "tractor" will refer to such a tractor, which generally is referred to as a medium size lawn and garden tractor, although such tractors can and are used for a wide variety of applications and are not limited to lawn and garden type uses. The term tractor will generally refer to medium-sized lawn and garden tractors that have a size, weight and frame strength that can support and operate a rototiller attached directly to the back of the tractor. The frame herein should be strong enough to support several hundred pounds (e.g. 300 pounds).

General Structure

FIG. 1 illustrates a spraying system 10 according to the preferred embodiment of the present invention. Reference numeral 10 will be utilized in this description to refer to the entire spraying system, including a load-bearing frame 12 attachable to tractor 14 by a hitch (designated generally by reference numeral 16). A container or tank 18 is fixed atop of frame 12. A spray boom 20 is also attached to frame 12. A hand-spray gun is operatively connected to and a part of spraying system 10. A manifold 24 is also associated with spraying system 10 and includes various hydraulic components such control valves, pressure gauges and other devices which will be further described in this specification.

As discussed in U.S. Pat. No. 5,190,218, incorporated by reference, tractor 14 can be any of several different types, all of which are characterized by the lack of a pto and being relatively mid- or medium-sized between smaller lawn and garden tractors and the larger agricultural or what might be termed large lawn and garden tractors with power take-offs. Tractor 14 can be a John Deere 318 tractor.

Frame 12 is custom built, but could be mass produced. Its proximal end to tractor 14 serves to not only connect frame 12 to tractor 14, but also support it above the ground in an essentially horizontal position.

Hitch 16 has two general portions. A first portion comprises structure rigidly attached to tractor 14. A second portion comprises structure rigidly attached to frame 12. As will be described in more detail, this structure allows for quick and relative easy attachment and detachment of frame 12 to and from tractor 14. The connection between frame 12 and tractor 14 is similar in some respects to that described and shown in U.S. Pat. No. 5,190,218, but in other aspects is different, as will be pointed out later.

Tank 18 is fixed to frame 12 and contains the substance to be sprayed. Spray-boom 20 is operatively connected to tank 18 and a pump assembly 26 (not shown in FIG. 1, but see FIG. 18). Pump assembly 26 utilizes rotational power from the motor of tractor 14 to operate a hydraulic pump 28 (see FIG. 18) to move, under pressure, a sprayable substance from tank 18 through appropriate hoses to spray-boom 20.

In FIG. 1 spray-boom 20 is shown in its fully extended position, ready to spray a swath of ground that is considerably wider than the width of tractor 14.

Therefore as can be seen by FIG. 1, spraying system 10, when installed to the rear of tractor 14, can be moved across an area. The operation of the engine of tractor 14, provides both motive power for tractor 14 as well as spraying pressure for spraying system 10. Spraying system 10 is rigidly but releasable connected to tractor 14 above the ground without a trailer and without its own independent power source. Frame 12 and tank 18 are approximately equal to or narrower than the width of tractor 14. Spray-boom 20 can be expanded wider than the width of tractor 14, as will be discussed later, can be folded up to less than the width of tractor 14. Therefore, when spray-boom 20 is folded, tractor 14 and spraying system 10 can pass through any opening width that tractor 14 can pass through. The length and height of spraying system 10, in combination with tractor 14, are also of a size that both can be readily transported if needed, usually by similar transportation that can be used just for tractor 14. Examples are pick-up trucks or utility trailers.

Frame and Hitch

By referring to FIGS. 2–7, the details of frame 12 and hitch 16 can be seen and described in more detail. Frame 12 comprises a main frame 30 of basically rectangular shape made of 28.00" long parallel channel-iron rails 32 and 34 (2" tall middle section; 1" wide flanges; 3/16" thickness (HR steel)). A front cross-member 36 (11.88" long×1" tall×1/4" thick HR bar stock) extends transversely between rails 32 and 34 at the front of the main frame while rear cross-member 38 (13.88" long×2" tall×1/4" thick HR stock) extends across the rear between frame rails 32 and 34.

A tank mount frame 40 (see FIG. 2) is rectangular and welded together on top of, but transversely across, rails 32 and 34. Tank mount frame 40 is comprised of channel-irons 42 and 44 (29.50 inches long, 2 inches tall, 3/16 inch channel-iron (HR steel)). End members 46 and 48 complete the rectangular tank mount frame 40 and are 17.13 inches long, 1.5 inches tall perpendicular walls, 1/8 inch thick angle iron. Tank 18 sits within or on tank mount 40 and is attached into position by securing straps or by mounting lug holes formed directly in the tank, which could allow mounting of the tank directly to tank mount frame 40 by bolts. There are a variety of ways to mount tank 18 to frame 30, the details of which are well within the skill of those skilled in the art.

FIG. 2 also shows left and right boom supports 46 and 48 which extend vertically from rear cross-member 38 of mainframe 30. Supports 36 and 38 (14 inches tall, 1×1×0.06 wall tubing) rigidly support, along their lengths, the spray boom 20. Structure allows the height of boom 20 relative to the ground to be adjusted along their lengths, as is within the skill of those skilled in the art.

Spray tank 18 is shown in ghost lines in FIG. 2 to allow further detail of hitch 16 to be shown. Hitch 16 will now be described in detail by reference to FIGS. 2 and 3. At the front, outside of each rail 32 and 34 of frame 12 is bolted a hitch-plate 50. Hitch-plate 50 includes a lower slot 52 and an upper slot 54. As shown in FIG. 2, tractor 14 includes left and right bars 56 which are bolted or otherwise secured to the existing frame-work of tractor 14. Each bar 56 has a lower pin 62 and upper pin 54 extending outwardly but spaced apart a distance that corresponds with the distance between lower slot 52 and upper slot 54 in hitch-plate 50. As can be seen in FIGS. 2 and 3, when hitch-plates 50 are positioned so that pins 62 and 64 are within slots 52 and 54, frame 12 is hitched to tractor 14.

As can be seen in FIGS. 2 and 3, lower slots 52 are basically vertical whereas upper slots 54 are basically horizontal (when frame 12 is generally horizontal). Thus, when in place, pins 62 bear most of the downward force of frame 12 and any load on frame 12, and prevent frame 12 from moving forward or rearward relative to tractor 14. Pins 64 in slots 54, on the other hand, prevent vertical movement of frame 12 relative to tractor 14, or forward tilting of frame 12 relative to tractor 14, as will be appreciated in later discussion. Slots 54, however, do allow rearward and downward tilting of frame 12 around pins 62, which is associated with how frame 12 can be easily mounted and dismounted from tractor 14.

Therefore, a lock-down mechanism 66 can be utilized with frame 12 to lock pins 64 into place, as shown in FIGS. 2 and 3. A bar latch 68 is pivotally fixed to each hitch-plate 50 by bolts 70. The front of bar latch 68 includes a capture notch 72 configured to matingly receive a pin 64. A release bar 74 is welded to and between the other ends of bar latches 68 and extends upward and across rails 32 and 34. A spring 76 is attached between release bar 74 and an anchor 78 attached to the inside of rail 32.

As shown in FIG. 3, in a normal position spring 76 pulls release bar 74 rearwardly and downwardly so that it would be in a position to lock pins 64 in slots 54. Spring 76 here is a #68 spring, 27.3 lbs/in, 5" length, O.D. 1 1/16", wire gauge 0.105. If release bar 74 is manually pushed forwardly (as shown in ghost lines in FIG. 3), capture slots 72 of bar latches 68 would pivot away from a lock-down position and allow frame 12 to be tilted downwardly so that pins 64 would move out of upper slots 54 of hitch-plates 50 to begin the detachment of frame 12 from tractor 14.

Thus, in a normal position, lock-down mechanism 66 would completely capture pins 64 within hitch-plates 50 and, with pins 62 in slots 52, prevent movement of frame 12 in any direction after attachment to and during operation of spraying system 10 relative to tractor 14. To release the lock-down mechanism would only require one hand to grab release bar 74 and tilt it upwardly and forwardly, overcoming the force of spring 76.

Figure 20:
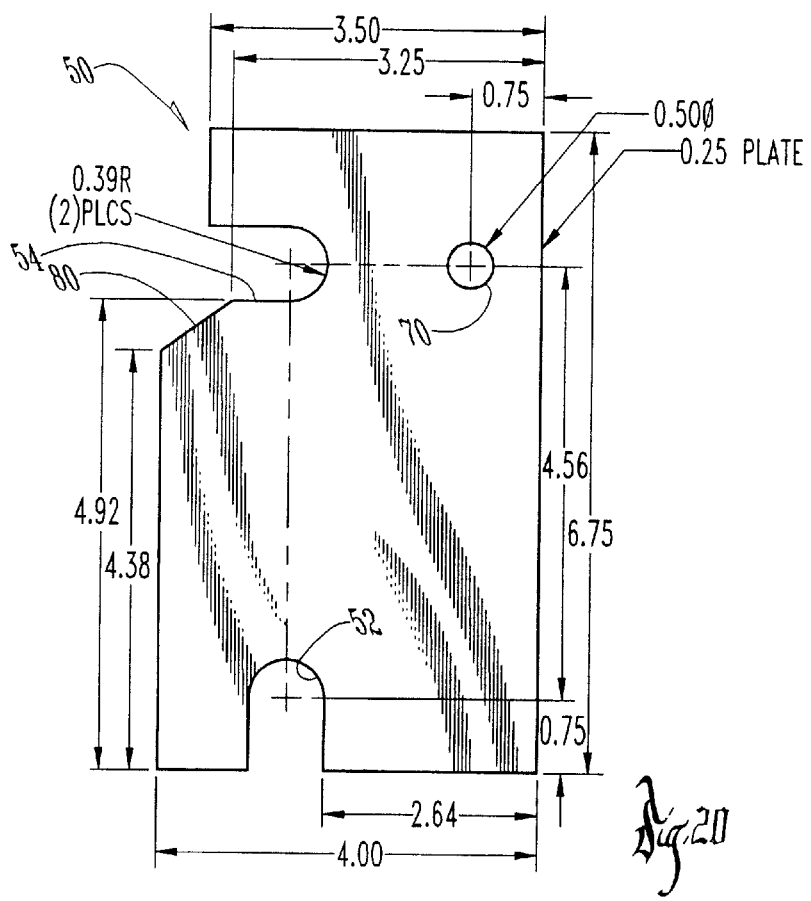
FIG. 20 is a dimensioned side elevational view of hitch plate 50 of FIGS. 2 and 3.
Figure 21:
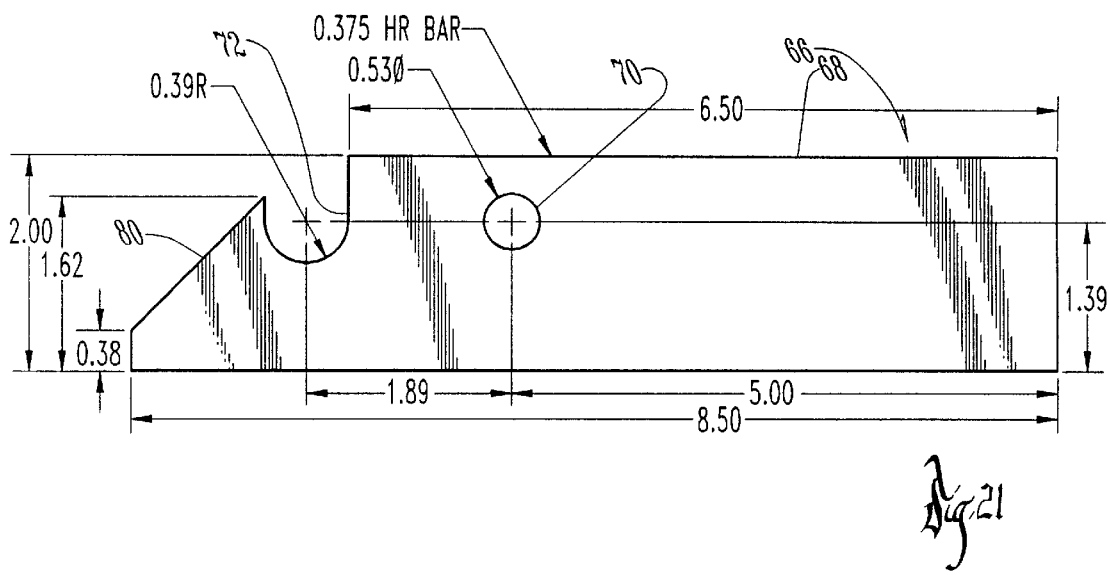
FIG. 21 is a dimensioned side elevational view of bar latch 68 of FIGS. 2 and 3.

It is to be understood that the exact configuration of the parts of frame 12, tank mount frame 40, hitch-plates 50, bar latches 68 and the other described components can vary. In this embodiment, the exact dimensions of hitch-plates 50 and bar latches 68 are shown in detail in FIGS. 20 and 21. Note that hitch-plates 50 have an angled portion 80 to facilitate the easy reception of upper pin 64 when frame 12 is tilted to upper pin 64 and, also, that edge 82 is below the plane defined by edge 84. Also note that bar latches 68 have an angled front edge 86 in front of capture slot 72 and that front edge 86 is below the plane defined by edge 88. Slope 86 allows bar latches 68 to automatically capture upper pins 64 as pins 64 would ride along edge 86 and force the front end of bar latches 68 downwardly until pins 64 reached capture slots 72. Spring 76 would then pull bar latches 68 back and downwardly to automatically capture upper pins 64. It is to further be understood that a release bar stop 84 (see FIG. 7) could be welded to the side of either hitch-plate 50. Stop 84 can be a 1"×1" square, 1/4" thick HR bar welded at an angle as shown in FIG. 7 such that when bar latches 68 are tilted to release upper pins 64 from capture slots 72, stop 84 prohibits bar latches 68 from continuing to pivot backwardly more than needed. One requirement of stop 84 is that it be placed so that capture slots 72 can be moved out of the way sufficiently so that upper pins 64 can move freely in and out of upper slots 54.

Mounting and dismounting of frame 12 to tractor 14 is further illustrated by FIGS. 4–7. FIG. 4 shows, by side elevation, frame 12 in the fully mounted, fully hitched position shown in FIGS. 1–3. It can be seen that hitch-plates 50 are supported by lower pins 62, which are fully inserted in slots 52 of hitch-plates 50. Bar releases 68 are in their normal lock-down position and therefore pins 64 are also within capture slots 72 of bar latches 68. Frame 12 is thus generally horizontal and mounted upon the four pins (left and right upper pins 62 and left and right lower pins 64). Frame 12 therefore cannot move forward, backward, up, down, or side to side. The structural integrity of the components of frame 12 are selected to be strong enough to withstand considerable forces that would be experienced at or around pins 62 and 64 for the particular load at issue.

FIGS. 5–7 illustrate how frame 12 would be mounted to pins 62 and 64. In FIG. 5, frame 12 is laying on the ground and is completely detached from tractor 14. The first step for attachment would be for the user to stand along one side of frame 12. The user could grab frame 12 at fore and aft positions, or grab frame 12 solely at a forward (closest to tractor 14) position, and raise the front of frame 12 so that lower slots 52 are moved above lower pins 62. Frame 12 would then be dropped so that pins 62 enter slots 52 which would result in the orientation of frame to tractor shown in FIG. 6. There, to get the position of FIG. 6, the user had only to essentially lift the front of frame 12 and its load and move it the several inches up and over pins 64. The whole frame and load do not have to be lifted. At that point a substantial amount of the weight of frame 12 and its load is supported on pins 62 and the frame/load are relatively stable relative to tractor 14. As shown in FIG. 6 by arrow 86, the next step would be for the user to lift the back end of frame 12 upwardly to the position shown in ghost lines in FIG. 6. As previously described, even though bar latches 68 are in the closed position (see FIG. 5, by virtue of spring 76 on release bar 74), when tilting frame 12 upwardly (see FIG. 6—rotating frame 12 about lower pins 62 when in lower slots 52), sloped edges 86 of bar latches 68 would come into contact with upper pins 64. By further rotation of frame 12 upwardly and forwardly, the force of spring 76 can easily be overcome and surfaces 86 of bar latches 68 would be forced downwardly opening up access to slots 54 for pins 64. Pins 64 could then enter upper slots 54 of plates 50 of frame 12 until pins 64 are entirely in slots 52 (see FIG. 7). At the point pins 64 are within the margins of capture slots 72, spring 76 would automatically cause bar latches 68 to rotate up (see arrow 88 in FIG. 7) until bar latches 68 are in the position shown in ghost lines in FIG. 7, which would lock pins 64 in place and lock frame 12 to the tractor 14. As can be understood, alternatively bar 74 could be manually pulled upwardly to open up upper slots 54 to pins 64, but that is generally unnecessary.

By essentially following the above described steps in reverse order, frame 12 can be detached from tractor 14. By referring to FIG. 7, the first step would be to manually lift release bar 74 in the direction opposite of arrow 88 until bar latches 68 are in the position shown in solid lines in FIG. 7. This frees up the ability of upper pins 64 to leave upper slots 54 of plates 50 by simply letting the back of frame 12 move downwardly (opposite to the direction of arrow 86 in FIG. 6 and to the position shown in solid lines in FIG. 6). It is to be noted that one person could simultaneously lift release bar 74 and allow the back end of frame 12 to pivot down to the ground because most of the weight is supported by lower pins 62. The final step would be to grab the front of frame 12 and lift frame 12 off of lower pins 62, move the entire frame and load back away from pins 62 and 64, and allow the front end of frame 12 to move the few inches down to the ground.

It can therefore be appreciated that one person could attach and detach frame 12, even with a substantial load, quickly and relatively easily. It is particularly emphasized that both attachment and detachment is facilitated to allow one person to accomplish the same. Unlike U.S. Pat. No. 5,190,218, the attachment and detachment can be made relatively easily by one person standing on the same side of frame 12. There is no need to move from side to side to operate individual locking pins at the front of the frame where there is not much room to do so.

Adapter Members

One feature of the invention is the possibility to manufacture all hitch plates 50 (or the characteristics of slots 52 and 54) identically, so that the invention can be more easily mass produced. The problem is that different models of tractors 14 do not come with pins 62 and 64, or even with similar rear structure. By referring to FIGS. 16 and 17, it can be seen that a variety of forms of the portion of hitch 16 affixed to the rear of tractor 14 can be made. FIG. 16 illustrates an embodiment where vertical bars 56 are bolted to existing plates 92 on tractor 14 by bolts 94, and utilizes a cross bar 96 and ear 98 along with bolt 100 to secure the bottom of bars 56 to existing structure 102 on tractor 14. The arrangement of FIG. 16 is operable for a John Deere Model 318 tractor.

On the other hand, FIG. 17 shows that vertical bars 56A are mounted to existing structure of a Cub Cadet brand Model 1450 tractor by mounting cross bar 108 to existing structure 106 of tractor 14 by bolts 110. In both FIGS. 16 and 17, the size and spacing between pins 62 and 64 (and 62A and 64A) can be identical so that identical hitch plates 50 would work for either adapter member and tractor type. As can be fully appreciated, other configurations to present pins 62 and 64 to hitch plates 50 can be created and the invention is not limited by this specific configuration of supporting structure for pins 62 and 64. On the other hand, different sizing of or spacing between pins 62 and 64 could be used. Additionally, specific use of pins and receiving slots is not necessarily the only configuration operable with the invention. Pins 62 and/or 64 do not necessarily need to be on the tractor portion of hitch 16, and conversely slots 52 and/or 54 do not necessarily need to be on the frame side of hitch 16.

Therefore, by using adapter plates such as shown in FIGS. 16 and 17, frame 12 could be utilized with a variety of different types of tractors.

Break Away and Foldable Spray Boom Arms

FIGS. 8–11 illustrate with more specificity the structure and function of spray boom 20. FIG. 8 shows boom 20 in fully extended, unfolded position symmetrical relative to posts 46 and 48 attached to frame 12. A central boom section 112 is attached to posts 46 and 48 (and may optionally be vertically adjustable along posts 46 and 48) and extends laterally to opposite ends where break away joints 114 are positioned. Middle boom sections 116 extend from break away joints 114 to fold joints 118. Outer boom sections 120 extend from fold joints 118 to the distal opposite outer ends of boom 20.

As can be seen in FIG. 8, first and second hoses 122 and 124 communicate the substance to be sprayed out of nozzles 126 to essentially opposite sides of boom 20. Nozzles 126 are mounted to boom 20 by mounts such as known in the art at essentially uniformly spaced apart positions. Appropriate hose connectors 130 are utilized to connect various portions of hoses 122 and 124.

FIG. 8 shows that fold joints 118 are simply brackets that allow outer sections 120 of boom 20 to be folded upwardly and inwardly (see arrows 132 and ghost lines in FIG. 8). When folded down, the inner ends of outer sections 120 abut the outer ends of middle section 116 and hold the outer sections 120 level with the remainder of boom 20. In certain circumstances, the folding up of outer ends 120 may be sufficient for transport, travel or storage of spraying system 10, whether attached or detached to tractor 14. However, break away joints 114 also allow middle sections 116 to be folded in a horizontal plane back against center boom section 112 whether outer sections 120 are folded or not. Break away joints 114 also provide protection against breakage of either side of boom 20 when extended if either side strikes an object or vise versa.

FIGS. 9–11 show the basic structure of a break away joint 114. By particular reference to FIG. 11, it can be seen that a single plate 134 is originally fixed by bolts 136 to middle section 116 of boom 20. Single plate 134 has first and second spaced apart slots 138 that extend inwardly from the outer edge of single plate 134.

In comparison double plates 140/142 are fixed by welding or otherwise to center boom section 112 and are spaced apart to define a space 144 which is slightly larger than the thickness of single plate 134. This spacing is accomplished by bolts 146 which also are positioned to matingly match the spacing between slots 138 in single plate 134.

Spring 150 is connected at opposite ends to downwardly extending posts 148 and 152 of single plate 134 and double plates 140 respectively. Spring 150 urges plates 134 and 140 together. Spring 150 here is a #35 spring, 40.69 lbs/in, 2.78" long, O.D. ¾", 0.105 wire gauge, oil tempered.

Referring now to FIG. 9, it can be seen that in an extended, unfolded position, each middle section 116 of boom 120 is aligned along the same longitudinal axis with center section 12. As shown in solid lines in FIG. 9, slots 138 of single plate 134 would be positioned so that they are matingly engaged by posts 146 of double plate 140/142. Thus, no transverse movement of middle section 116 relative to boom 20 can take place. Middle section 116 cannot move any further towards center section 112 because it was limited by the ends of posts 146 in the terminal portions of slots 138. Spring 150 urges posts 146 towards the terminal ends of slots 138 and this works to prevent separation of middle section 116 from center boom section 112.

However, if a center or outer section 120 of boom 20 hits any object or vice versa, and if the force against that section of boom 20 exceeds the force of spring 150, the middle 116 and outer sections 120 of boom 20 would pivot in the direction of the force. For example, if the force (greater than that of spring 150) was in the direction of arrow 154F of FIG. 9, middle section 116 would pivot accordingly and the nearest slot 138 would lose its capture of the nearest post 146 (see ghost lines 116F of FIG. 9). On the other hand if the force was in the direction of arrow 154R of FIG. 9, middle section 116 would move to the position shown by ghost lines at 116R of FIG. 9. In either case, at least one of slots 138 maintains its capture of a post 146 to allow pivoting movement without complete separation of middle section 116 from center section 112. Thus joint 114 is essentially a double action joint. It does not matter if the boom is struck from in front or behind or the force comes from in front or behind.

FIG. 10 then shows that the structure of joint 114 also allows folding of middle section 116 back to center section 112. As shown by arrow 156 in FIG. 10, single plate 134 can be pivoted essentially 180 degrees around the lower-most post 146 of FIG. 10 until middle section 116 is essentially parallel to center boom section 112. Spraying 150 continues to urge the relevant post 146 into the terminal part of slot 138 to maintain a pivot joint, even when in that position.

Therefore, joint 114 has the dual function of double action break away plus allows an additional degree of foldability of boom 20.

All components of boom 20 could be made of steel or other metal, including plates 134 and 140, and posts 146.

Figure 13B:
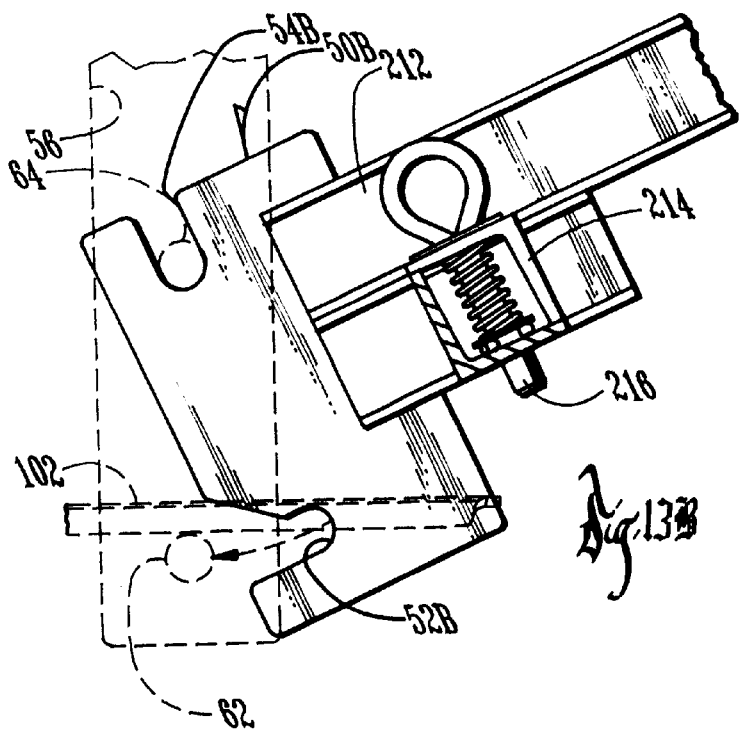

FIGS. 12–15 illustrate alternative embodiments of frame 12. Frame 212 of FIGS. 12 and 13 is similar to frame 12 but has the following differences. Lower slots 52B and upper slots 54B are essentially reversed as to orientation from that of slots 52 and 54 of plates 50. As can be seen, hitch plates 50B and frame 212 cooperate with pins 64 and 62 of vertical bars 56 as previously described except that when mounting frame 212, upper slots 54B are first inserted underneath and then upwardly against upper pins 64 (see FIG. 13A). Then, the back of frame 212 is brought downwardly so that slots 52B are brought forwardly into capture of lower pins 62 (see FIG. 13B). Thus, lower pins 62 prevent any further downward and forward rotation of frame 212 and pins 64 in combination with pins 62 hold frame 212 in place.

A cross member 214 and a spring loaded lock pin 216 could cooperate with an aperture in tractor portion 102 to lock frame 212 into place. Therefore, to detach frame 212, lock pin 216 is pulled down and frame 212 is pivoted upwardly to release slots 52B from pins 62. Then the entire frame 212 is lifted at an angle downwardly and away from tractor 14 to release pins 64 from upper slots 54B. As can be appreciated, this requires the complete frame 212, including any load, to be lifted off the ground at both ends and lock pin 216 to be operated when detaching frame 212 from tractor 14.

On the other hand FIGS. 14 and 15 show hitch plates 50C having lower and upper slots 52 and 54C that would cooperate with lower and upper pins 62 and 64. The shape of slots 54C is such that they are L shaped instead of simply elongated from opening to terminating end. In this way, a lock down mechanism may be able to be avoided. However, it would require that like frame 12 with locking plates 50, lower slots 52C be first lowered onto lower pin 62. Thereafter, however, the entire frame 12C would have to be lifted upwardly slightly so that upper pins 64 would enter the first part of L shaped slots 54C. Once this has occurred, the back of frame 12C would be moved upwardly and towards tractor 14 to move pins 64 into the terminal legs of slots 54C, at which point both sets of pins 62 and 64 would seat into the terminal parts of their respective slots 52C and 54C. The weight of frame 12C and any load should therefore hold frame 12C in position. However, it does not preclude the possibility that certain forces could jar frame 12C lose from pin 64 and 62.

The options of FIGS. 12–15 are presented to illustrate some various alternatives according to the present invention.

Pump Placement

FIG. 18 illustrates in more detail pump 28 and its association with the source of power to drive pump 28, which is supplied by tractor 14. First of all, a bracket 220 is configured to correspond with existing mounting holes (not shown) for the mower deck (not shown) that would ordinarily be bolted up to tractor 14. Therefore holes 222 with corresponding bolts would be utilized to fixedly mount bracket 220 to the underside of tractor 14 at or about the location of mower deck placement for tractor 14. Bar 224 is mounted (welded) in bracket 220. A plate 226 is mounted (welded) to bar 224 and bolts 228 pass through apertures in plate 26 and secure pump 28 to plate 226. A pulley 230 is fixed to the outer rotational shaft 232 of pump 28. Support arms 234 (welded or fixed at one end to bar 224) stabilize bracket 220 and bar 224 by being secured at their other ends by bolts 238 to existing portions 236 of tractor 14. The attachment can be by pins inserted through matching apertures in 236 and 234. The pins can be removably secured in place by cotter keys. As can be appreciated, the configuration of bracket 220, bar 224, plate 226, and arms 234 can vary according to need and tractor type.

Pulley 230 is configured to be essentially in a similar functional orientation and position as the drive pulley for the mower blade for the mower deck would be for the particular tractor at issue. FIG. 18 shows essentially diagrammatically the output shaft 240 from the engine of tractor 14 rotates a sheave 242. A belt 244 passes around sheave 242 and changes direction at rollers 246 and 248 and passes around pulley 230. Therefore, rotation of the output shaft 240 of the engine of tractor 14 would drive sheave 242. As a result belt 244 would rotate pulley 230 and cause pump 28 to operate. Also, pulleys 246 and 245 have tensioning capabilities so that belt 244 can be kept tensioned as desired by use of existing structure on tractor 14.

As can be appreciated, this arrangement allows quick and easy attachment and operation of the pump 28 of spraying system 10, which is dependent on the power of the engine of tractor 14. No independent power source such as an electrical or independent gasoline powered engine is required to operate the hydraulic pump. Only several bolts would have to be undone and belt 244 removed from around pulley 230 to take off the pump from the tractor. Inlet and outlet hoses 250 and 252 to pump 230 would not have to be disconnected when disconnecting spraying system 10 from tractor 14.

As can be further understood, the placement of pump 230 is low relative to tractor 14. It is lower than tank 18. Therefore, fluid or substance from tank 18 would by gravity always be available to and at pump 230. This eliminates the need for a self priming pump. Also, the pump would always be operating because sheave 242 would be turning even when a tractor is immobile and idling. Thus, the spray pressure, at a sufficient operation level, would always be available for spraying system 10.

Hydraulic System

Figure 19:
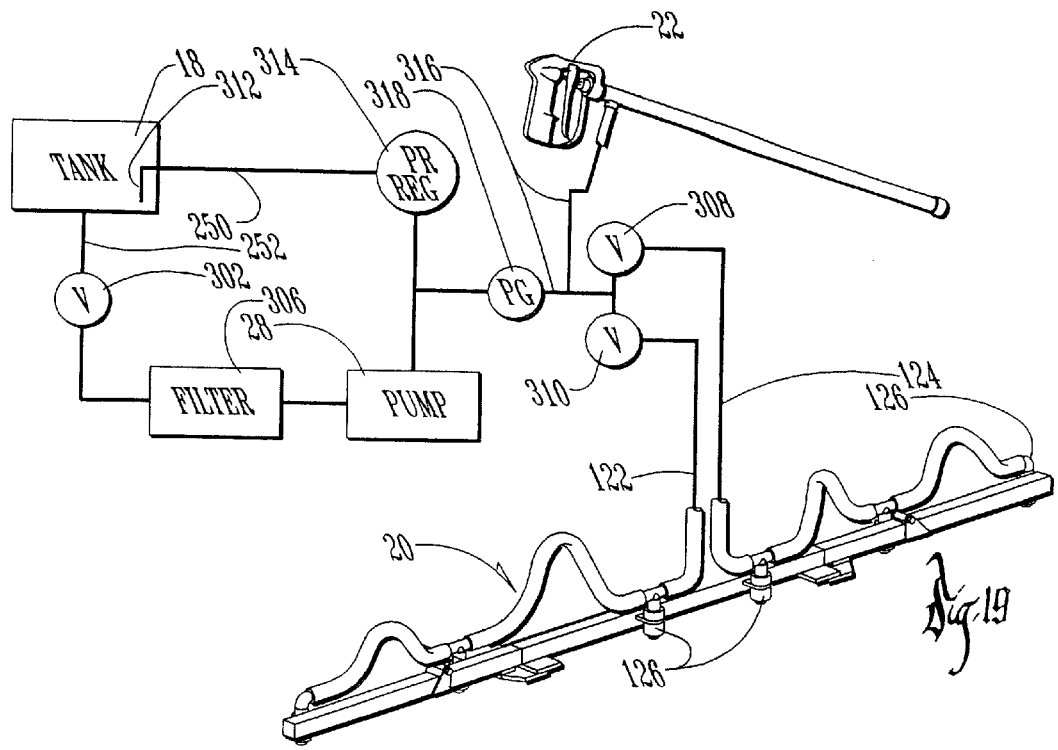
FIG. 19 is a diagrammatic view of the hydraulic circuit according to a preferred embodiment of the invention.

FIG. 19 diagrammatically depicts the hydraulic system according to the present invention. It is essentially the same as FIG. 8 of U.S. Pat. No. 5,190,218 except that there is no by-pass valve and circuit 58. Inlet hose 250 to tank 18 is directly connected to the interior of tank 18. An agitator 312 can be placed in tank 18, such as is known in the art. Outlet hose 252 travels to a main shut-off valve 302 and then to pump 28. A filter 306 is between tank 18 and pump 28. A pressure regulator 314 completes a continuous circuit from pump 28 to tank 18 back to pump 28. A line 316 is connected into the foregoing fluid circuit and extends to spray gun 22 and valves 308 and 310. It should be understood that hand sprayer 22 has an internal trigger valve that allows the operator to immediately, and any time pressure is in the circuit, select a fluid pathway through hose 316 to hand sprayer 22. Thus, even when the engine is idling and the tractor 14 is immobile, the constant source of spray pressure would allow an operator to get off tractor 14, take hand sprayer 22, and spray substance from tank 18.

Filter 306 is utilized to remove suspended solids or impurities and to prevent clogging of pump 28 or lines or nozzles. Valves 308 and 310, with corresponding operator levers (see FIG. 1), control spray to both hoses 122 and 124 at boom 20 (each side of boom 20). When pressure exists in the fluid circuit, valves 308 and 310 can be operated at any time to deliver fluid to respective parts of boom 20.

Alternatives, Features and Options

Different types and configurations of parts and components could be used with the invention. Below are examples. All are available from Sprayer Specialties Inc. of Grimes except as otherwise noted.

Sprayer gun 22: Model AA23L-776-18 with 5500 Brass adjustable tip, 18" aluminum ¼" NPS(M) inlet connection, ¹¹⁄₁₆" tip outlet thread (M) output to 5 GPM, pressure to 250 PS, made by Spraying Systems Co. (sized for pump 28, so that no foaming occurs).

Pump 28: Model 4101N-R Ni-Resist 4-roller pump with Super Roller, Viton Seals; ¾" NPT ports, and ⅝" solid shaft, 9.0 Max GPM, 150 Mas. PSI, 1800 max. RPM, from Hypro Corp., New Brighton, Minn. (pump 28 does not need to be self-priming, and is a relatively small volume, standard hydraulic pump).

Tank 18L: spot sprayer tank with six ⁵⁄₁₆" mounting lug holes on bottom, 25 gallon, Model SOL25SPOT from Solar Tanks of Minneapolis, Minn.

Filter 306: Strainer, polypropylene and nylon strainers, Model CP23174-3-304SS, Tee Jet 122 Series, 50 mesh.

Pressure Gauge 318: Model GA212100L, 2½"×100# Glycerin Filled.

Agitator Assembly 312: AG agitator.

Valve 308 and 310: Manual directovalve AA6B1 from Spraying Systems Co. of Wheaton, Ill.

Check valves can be used inside nozzles 126 (require a few pound of pressure before release to prevent dripping): TeeJet check valves 4193A brass with stainless steel screens.

Tractor 14: John Deere 318, 100, 110, 200, 300, 400 series, Cub Cadet Model 1450. Others exit.

Further it is to be understood that frame 12 and hitch 16 can be used for many other functions. Examples include, but are not limited to, use with a sprayer. Other examples are use with a dump cart, lawn seeder, dry spreader, and an inner seeder. Other examples are possible.

The connection of pump 28, described above, eliminates the need for a tensioner, such as is part of what is done with blades on mower decks.

Pump 28 has a range of approximately 0–150 psi. Usually only 20 psi is needed, and therefore sufficient pressure exists even when tractor 14 is only idling. However, the spraying system is powerful enough to generate pressures at the high end of the pump's range. This can be valuable, for example, when using the system for orchard spraying, which requires vertical spraying and pressures on the order of 100 psi.

Conventional connections, connectors, clamps, and seals are used in the fluid circuit such as are known and within the skill of those skilled in the art.

It will be appreciated that the present invention can take many forms and embodiments. Variations obvious to those of skill in the art are included. The true essence and spirit of this invention are defined tin the appended claims, and it is not intended that the embodiment of the invention presented herein should limit the scope thereof.

What is claimed is:

1. A hitch having one portion attachable to a tractor and an other portion to a frame comprising;

said one portion comprising bottom and top sets of pins, each set aligned along an axis, each axis generally horizontal and transverse across an end of the tractor and spaced apart a distance;

said other portion comprising a first slot extending in a first direction into said other portion from an open entrance, a second slot spaced from the first slot and extending inwardly in a second direction into said other portion from an open entrance, the first direction and second directions being generally perpendicular to each other; said other portion of the hitch positioned at one end of the frame, the frame extending a substantial distance away from said other portion, the frame adapted to support a spray tank, spray boom, a spray controller, and fluid conduits.

2. The hitch of claim 1 further comprising a fluid pump connected to the fluid conduits and mountable to the bottom of a tractor by a mounting plate at a height which is lower than the spray tank.

3. A hitch comprising;

a first set of spaced apart, horizontally disposed hitching posts connected to the rear of a tractor;

a second set of spaced apart, horizontally disposed hitching posts connected to the rear of the tractor above the first set;

a frame, attachable and detachable to the hitch by mounting brackets on the frame, the mounting brackets positioned to align with the first and second sets of hitching posts when the frame is attached to the hitch;

a first set of slots at or near the bottom of the brackets and configured to matingly receive the first set of hitching posts when the brackets and frame are moved to a first position relative to the hitch, so that the mated first sets of posts and slots at least partially supports the frame and anything attached to or on the frame;

a second set of slots above the first set of slots on the brackets and configured to matingly receive the second set of hitching posts when the brackets and frame are moved from said first position to a second position where both the first and second sets of slots have received the first and second sets of posts.

4. The hitch of claim 3 further comprising a spraying system supported by the frame.

* * * * *